(12) United States Patent  
Fueta et al.

(10) Patent No.: US 8,856,174 B2
(45) Date of Patent: Oct. 7, 2014

(54) ASSET MANAGING APPARATUS AND ASSET MANAGING METHOD

(75) Inventors: Shigeki Fueta, Yokohama (JP);
Hiroyuki Tamon, Yokohama (JP);
Masayuki Iguchi, Edogawa (JP); Naoki Matsushita, Chatswood (AU)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/606,811

(22) Filed: Sep. 7, 2012

(65) Prior Publication Data

US 2012/0331004 A1 Dec. 27, 2012

Related U.S. Application Data

(63) Continuation of application No. PCT/JP2010/002009, filed on Mar. 19, 2010.

(51) Int. Cl.
*G06F 7/00* (2006.01)
*G06F 17/30* (2006.01)
*G06Q 10/06* (2012.01)
*G06Q 10/10* (2012.01)

(52) U.S. Cl.
CPC ............. *G06Q 10/063* (2013.01); *G06Q 10/06* (2013.01); *G06Q 10/103* (2013.01)
USPC .......................................... 707/776; 717/120

(58) Field of Classification Search
None
See application file for complete search history.

(56) References Cited

U.S. PATENT DOCUMENTS

| | | | |
|---|---|---|---|
| 7,370,027 B2* | 5/2008 | Sakurazawa et al. ......... | 707/621 |
| 2001/0029474 A1* | 10/2001 | Yada ............................... | 705/28 |
| 2003/0083948 A1* | 5/2003 | Rodriguez et al. ............. | 705/26 |
| 2003/0085997 A1* | 5/2003 | Takagi et al. .................. | 348/143 |
| 2003/0135439 A1* | 7/2003 | Yagishita ....................... | 705/36 |
| 2005/0198247 A1* | 9/2005 | Perry et al. .................... | 709/223 |
| 2007/0043860 A1* | 2/2007 | Pabari ............................ | 709/224 |
| 2009/0030952 A1* | 1/2009 | Donahue et al. .............. | 707/203 |
| 2012/0102334 A1* | 4/2012 | O'Loughlin et al. ......... | 713/189 |

FOREIGN PATENT DOCUMENTS

| | | |
|---|---|---|
| JP | 2003-208413 | 7/2003 |
| JP | 2004-222105 | 8/2004 |
| JP | 2005-44011 | 2/2005 |
| JP | 2008-250866 | 10/2008 |

(Continued)

OTHER PUBLICATIONS

International Search Report of Corresponding PCT Application PCT/JP2010/002009 mailed Jun. 22, 2010.

(Continued)

*Primary Examiner* — Tarek Chbouki
*Assistant Examiner* — Karina Levitian
(74) *Attorney, Agent, or Firm* — Staas & Halsey LLP

(57) ABSTRACT

A search extend setting unit that identifies a layer made to correspond to an asset specified by referencing a first database for recording assets made to correspond to each of users by relating each of the assets to a first layer that is a layer related to a virtual system individually used by each of the users, or to a second layer that is a layer related to hardware and software, and to set an extent for extracting information about other assets having a relationship with the specified asset according to a layer of the specified asset, and an extracting unit that extract other assets that have a relationship with the specified asset and are present in the extent set by referencing the first database and a second database for recording information indicating a relationship among the assets, and the first database based on the first asset.

6 Claims, 14 Drawing Sheets

(56) References Cited

FOREIGN PATENT DOCUMENTS

| | | | | |
|---|---|---|---|---|
| JP | 2008-287663 | | 11/2008 | |
| JP | 2009-245409 | | 10/2009 | |
| KR | 20110070692 | * | 6/2011 | .............. G06F 17/00 |

OTHER PUBLICATIONS

Notification of Transmittal of the International Preliminary Report on Patentability mailed Nov. 1, 2012 in corresponding International Application No. PCT/JP2010/002009.

* cited by examiner

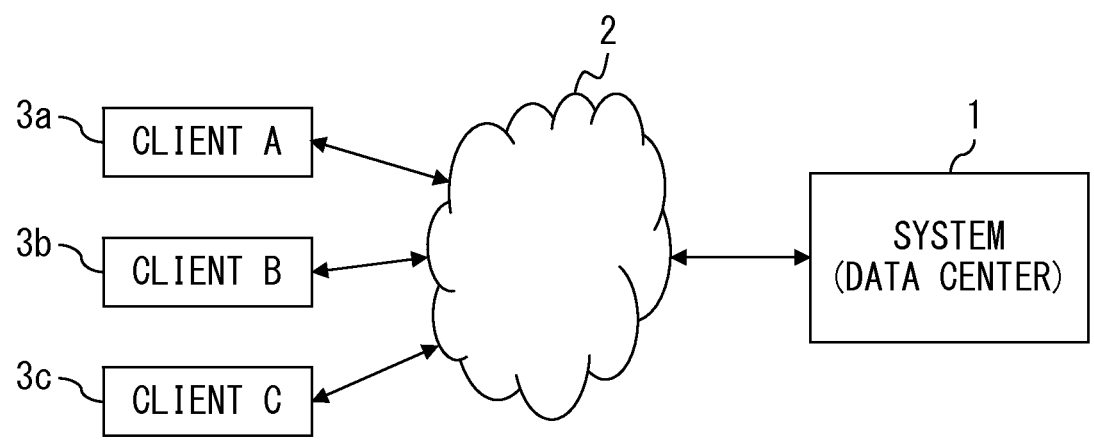
F I G. 1

| LAYER NAME | ATTRIBUTE 1 (SUB-LAYER) | ATTRIBUTE 2 | ... | ATTRIBUTE n |
|---|---|---|---|---|
| TRANSACTION LAYER | — | ⋮ | ⋮ | ⋮ |
| APPLICATION LAYER | — | ⋮ | ⋮ | ⋮ |
| INFRASTRUCTURE LAYER | VIRTUAL INFRASTRUCTURE LAYER | ⋮ | ⋮ | ⋮ |
| INFRASTRUCTURE LAYER | PHYSICAL INFRASTRUCTURE LAYER | ⋮ | ⋮ | ⋮ |
| BACKUP LAYER | — | ⋮ | ⋮ | ⋮ |
| DATA LAYER | — | ⋮ | ⋮ | ⋮ |

FIG. 4

| ENTITY NAME | ENTITY IDENTIFIER | ATTRIBUTE 1 (LAYER) | ATTRIBUTE 2 (CLIENT NAME) | ... | ATTRIBUTE n |
|---|---|---|---|---|---|
| TRANSACTION 1 | E001 | TRANSACTION LAYER | CLIENT A | ... | ... |
| TRANSACTION Y | E002 | TRANSACTION LAYER | CLIENT C | ... | ... |
| TRANSACTION FLOW 1 | E003 | TRANSACTION LAYER | CLIENT A | ... | ... |
| APPLICATION 1 | E004 | APPLICATION LAYER | CLIENT A | ... | ... |
| APPLICATION 3 | E005 | APPLICATION LAYER | CLIENT A | ... | ... |
| APPLICATION a | E006 | APPLICATION LAYER | CLIENT B | ... | ... |
| APPLICATION y | E007 | APPLICATION LAYER | CLIENT C | ... | ... |
| SOURCE 1 | E008 | APPLICATION LAYER | CLIENT A | ... | ... |
| SERVER x | E009 | INFRASTRUCTURE LAYER (VIRTUAL INFRASTRUCTURE LAYER) | CLIENT A | ... | ... |
| SERVER z | E010 | INFRASTRUCTURE LAYER (VIRTUAL INFRASTRUCTURE LAYER) | CLIENT C | ... | ... |
| OS1 | E011 | INFRASTRUCTURE LAYER (VIRTUAL INFRASTRUCTURE LAYER) | CLIENT A | ... | ... |
| OS1 | E012 | INFRASTRUCTURE LAYER (VIRTUAL INFRASTRUCTURE LAYER) | CLIENT C | ... | ... |
| SERVER 1 | E013 | INFRASTRUCTURE LAYER (PHYSICAL INFRASTRUCTURE LAYER) | — | ... | ... |
| DB1 | E014 | INFRASTRUCTURE LAYER (PHYSICAL INFRASTRUCTURE LAYER) | — | ... | ... |
| ... | ... | ... | ... | ... | ... |

FIG. 5

| ENTITY IDENTIFIER (PARENT) | LINKING IDENTIFIER | ENTITY IDENTIFIER (CHILD) | BINOMIAL RELATIONSHIP ATTRIBUTE 1 (REGISTRATION DATE) | ... | BINOMIAL RELATIONSHIP ATTRIBUTE n |
|---|---|---|---|---|---|
| E001 (TRANSACTION 1) | L003 (REFERENCE) | E003 (TRANSACTION FLOW 1) | 2009.02.22 | ... | xxx |
| E001 (TRANSACTION 1) | L003 (REFERENCE) | E004 (APPLICATION 1) | 2008.06.01 | ... | xxx |
| E004 (APPLICATION 1) | L003 (REFERENCE) | E008 (SOURCE 1) | 2009.10.01 | ... | xxx |
| E004 (APPLICATION 1) | L003 (REFERENCE) | E005 (APPLICATION 3) | 2009.10.01 | ... | xxx |
| E009 (SERVER x) | L004 (INCLUDE) | E004 (APPLICATION 1) | 2008.06.01 | ... | xxx |
| E009 (SERVER x) | L004 (INCLUDE) | E005 (APPLICATION 3) | 2009.02.22 | ... | xxx |
| E009 (SERVER x) | L004 (INCLUDE) | E011 (OS1) | 2009.10.01 | ... | xxx |
| E013 (SERVER 1) | L004 (INCLUDE) | E009 (SERVER x) | 2009.10.01 | ... | xxx |
| E013 (SERVER 1) | L004 (INCLUDE) | E010 (SERVER z) | 2009.08.08 | ... | xxx |
| E013 (SERVER 1) | L004 (INCLUDE) | E014 (DB1) | 2008.06.01 | ... | xxx |
| E013 (SERVER 1) | L001 (READ) | E014 (DB1) | 2009.02.22 | ... | xxx |
| E005 (APPLICATION 3) | L001 (READ) | E014 (DB1) | 2008.06.01 | ... | xxx |
| E007 (APPLICATION y) | L003 (REFERENCE) | E007 (APPLICATION y) | 2009.01.30 | ... | xxx |
| E002 (TRANSACTION Y) | L004 (INCLUDE) | E006 (APPLICATION a) | 2010.02.22 | ... | xxx |
| E010 (SERVER y) | L004 (INCLUDE) | E012 (OS1) | ... | ... | xxx |
| E010 (SERVER z) | ... | ... | ... | ... | ... |

F I G. 6

| LINKING NAME | LINKING IDENTIFIER | LINKING ATTRIBUTE 1 (REGISTRATION DATE) | LINKING ATTRIBUTE 2 (NOTE) | ... | ATTRIBUTE n |
|---|---|---|---|---|---|
| READ | L001 | 2009.10.01 | xxx | ... | ... |
| WRITE | L002 | 2009.10.01 | yyy | ... | ... |
| REFERENCE | L003 | 2008.06.01 | zzz | ... | ... |
| INCLUDE | L004 | 2009.02.22 | aaa | ... | ... |
| ... | ... | ... | ... | | ... |

F I G. 7

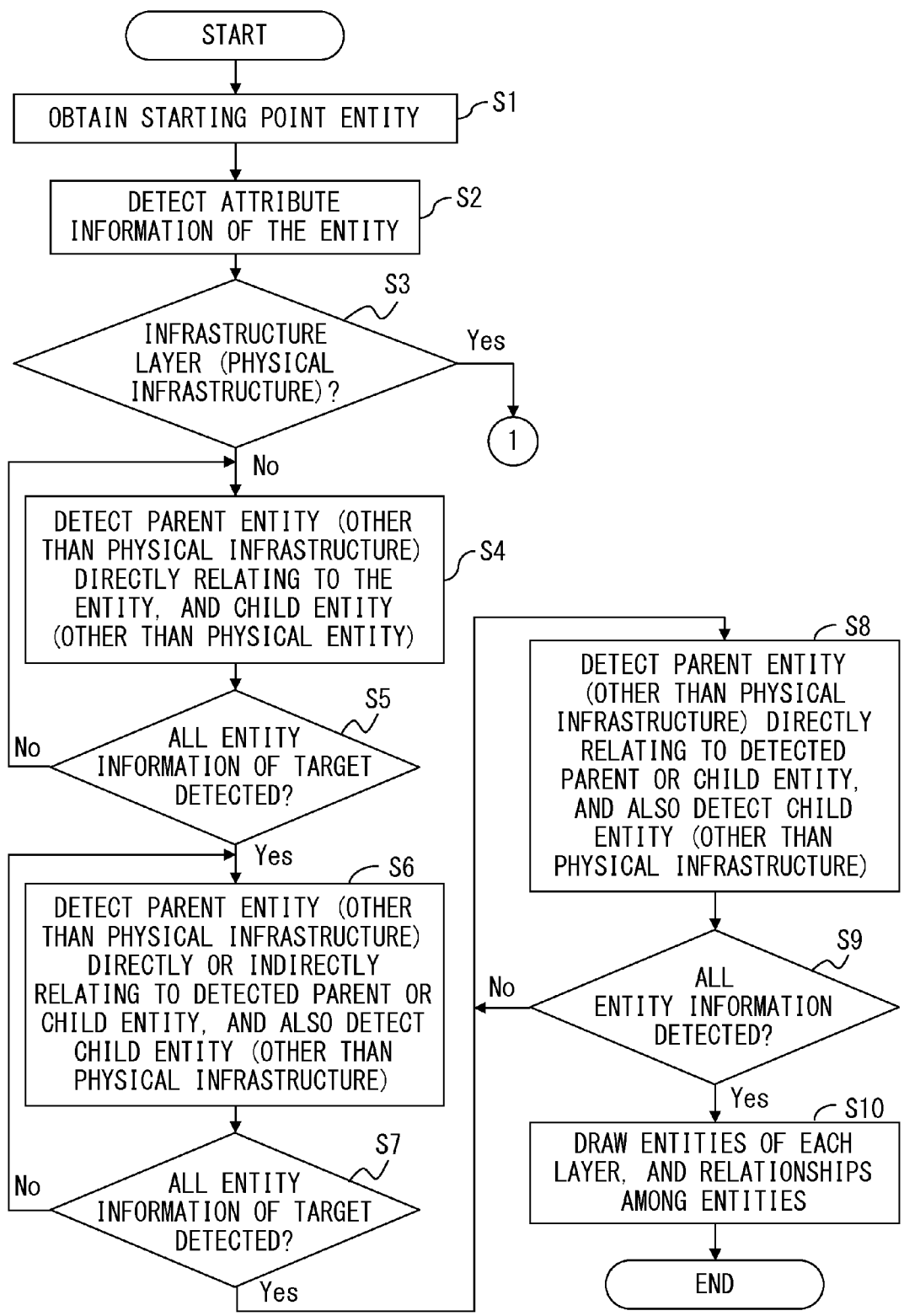
F I G. 8

| DISTANCE | MAGNIFICATION |
|---|---|
| 1 | 5 |
| 2 | 3 |
| 3 | 2 |
| 4 | 1 |
| 5 | 0.5 |
| ⋮ | ⋮ |

FIG. 11

| DATA AMOUNT | PATH THICKNESS |
|---|---|
| 10,000 OR MORE | 20 POINTS |
| ⋮ | ⋮ |
| 1,000 OR MORE | 10 POINTS |
| ⋮ | ⋮ |
| 100 OR MORE | 5 POINTS |

FIG. 12

| NUMBER OF ACCESSES | PATH COLOR |
|---|---|
| 100,000 OR MORE/DAY | RED |
| ⋮ | ⋮ |
| 10,000 OR MORE/DAY | YELLOW |
| ⋮ | ⋮ |
| 100 OR MORE/DAY | BLUE |

FIG. 13

ASSET MANAGING APPARATUS AND ASSET MANAGING METHOD

CROSS-REFERENCE TO RELATED APPLICATION

This application is a continuation application of International Application PCT/JP2010/002009 filed on Mar. 19, 2010 and designated the U.S., the entire contents of which are incorporated herein by reference.

FIELD

The embodiments discussed herein are related to an asset managing apparatus and an asset managing method, which are intended to manage assets.

BACKGROUND

In recent years, the demand for efficiently managing information technology assets has been made. However, relationships among information technology assets are complicated, and they are not always a one-to-one but multi-to-multi relationship in most cases. Accordingly, it becomes more difficult to accurately grasp a relationship among assets as the number of assets increases. Therefore, measures cannot be quickly taken, for example, in a case where a trouble has occurred in a system including assets, or in a case where system hardware or software needs to be updated. A case where an asset needs to be updated is considered. In this case, a system administrator needs to verify in advance what measures are to be taken for hardware or software, and whether or not there is a transaction (namely, a service for an end user) influenced by the update, and needs to notify a concerned person.

However, if relationships among assets cannot be accurately grasped, the system administrator cannot notify a concerned person and cannot properly update hardware and software quickly. Moreover, there are many management items to manage assets. Accordingly, the system administrator needs to grasp hardware, software, transactions and the like for each client using the system.

To implement this, the following technique is known. With this technique, the extent of an influence exerted on a system that assists a transaction, and the degree of a change of the entire system are initially calculated in response to a request to change a transaction. Next, information of relationships among resources are held, a layer structure is obtained by tracing the information of relationships, and also the extent of an influence is output.

Additionally, a virtual network operation state displaying apparatus for managing a relationship between a virtual network and a network of a layer lower than the virtual network, and for displaying a configuration of operations of the network is known. This apparatus enables a network configuration of a higher layer and a lower layer to be grasped at a glance. Moreover, the extent of an influence exerted by a fault at an occurrence of the fault is displayed to be easily identifiable. For example, a physical resource and a virtual resource are output as layers, and at the same time, the extent of an influence is displayed to be identifiable.

Japanese Laid-Open Patent Publication No. 2008-250866
Japanese Laid-Open Patent Publication No. 2004-222105

SUMMARY

An asset managing apparatus according to an embodiment includes a recording unit, a search extent setting unit and an extracting unit. The recording unit includes a first database for recording each of a plurality of assets made to correspond to each of a plurality of users by relating each of the plurality of assets to a first layer that is a layer related to a virtual system individually used by each of the plurality of users, or to a second layer that is a layer related to hardware and software, which realize each virtual system. The recording unit also includes a second database for recording a relationship among the plurality of assets.

The search extent setting unit identifies a layer made to correspond to the first layer by referencing the first database when the first asset among the assets is specified. Then, the search extent setting unit sets an extent for extracting information about another asset having a relationship with the first asset according to a layer of a first asset.

The extracting unit extracts other information technology assets having a relationship with the first asset included in the extent set by the search extent setting unit by referencing the first database and the second database based on the first asset.

The object and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIG. 1 is a conceptual schematic illustrating one implementation example of a form where a service is used via a network;

FIG. 4 illustrates one implementation example of a data structure of a layer database;

FIG. 5 illustrates one implementation example of a data structure of an item attribute database;

FIG. 6 illustrates one implementation example of a data structure of a binomial relationship database;

FIG. 7 illustrates one implementation example of a data structure of a linking attribute database;

FIG. 8 is a flowchart illustrating one implementation example of operations of the asset managing apparatus;

FIG. 11 illustrates one implementation example of a data structure of a magnification table;

FIG. 12 illustrates one implementation example of a data structure of a path definition table 1;

FIG. 13 illustrates one implementation example of a data structure of a path definition table 2.

DESCRIPTION OF EMBODIMENTS

Figure 2:
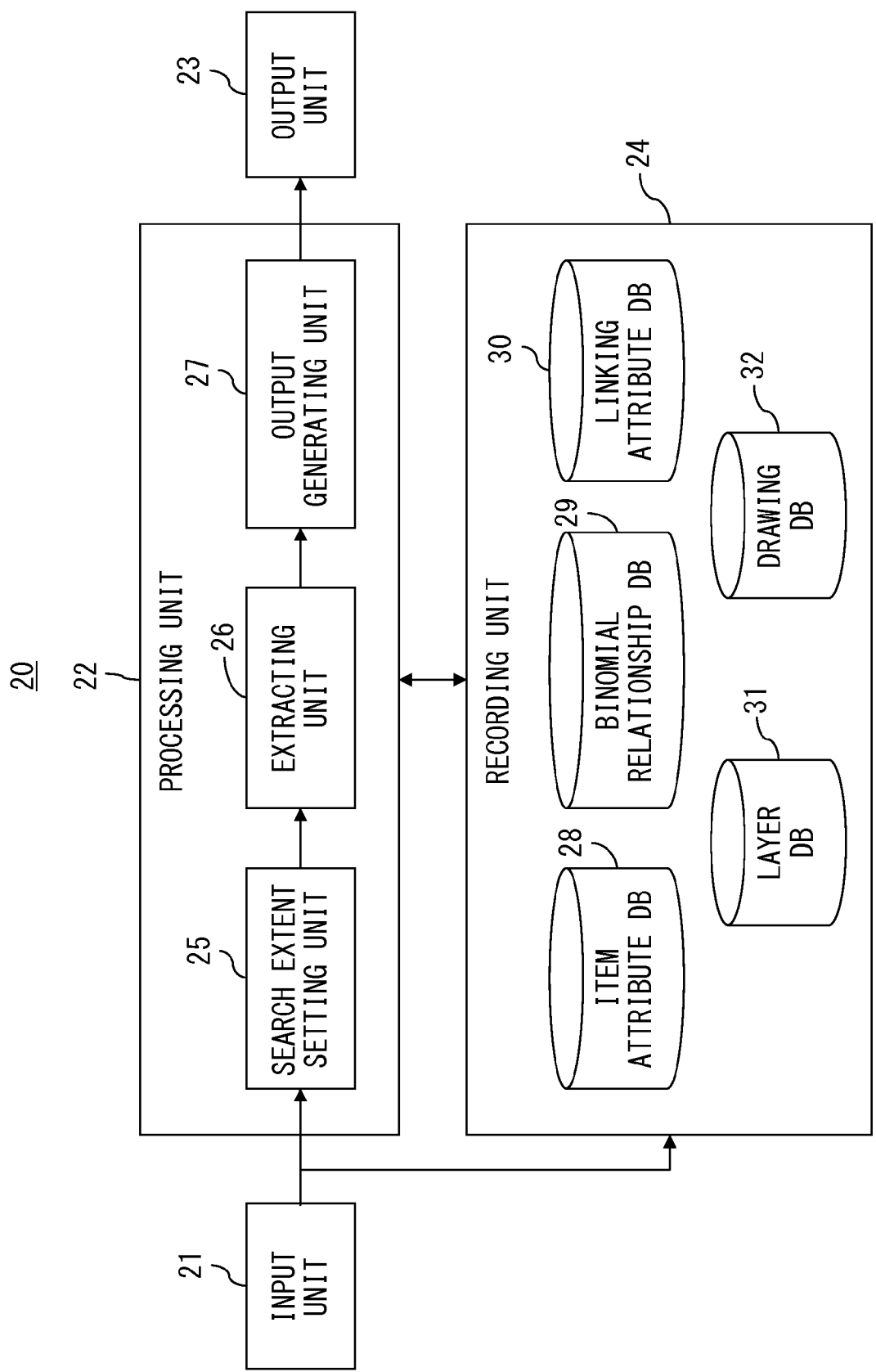
FIG. 2 illustrates one implementation example of an asset managing apparatus.

An embodiment is described in detail below with reference to the drawings.

FIG. 1 is a conceptual schematic illustrating one implementation example of a form using a service via a network. As illustrated in FIG. 1, the form of a system where a plurality of end users use information technology assets present in the system 1 connected to a network 2 is assumed. In such a system form, a user utilizes a virtual system realized with hardware and software of the system 1 as a system dedicated to each user.

Here, the system 1 is an apparatus or software installed at a data center or the like. The user is an individual, an enterprise or the like using a virtual system executed by hardware or the software of the system 1. In FIG. 1, "client A" 3a, "client B" 3b and "client C" 3c schematically represent virtual systems respectively used by an individual, an enterprise or the like as users.

Additionally, assets are information technology assets, and broadly classified into physical assets and virtual assets. The physical assets indicate actual hardware, actual software and the like, which configure the system 1 that is a data center or the like. The actual hardware and the actual software are sometimes referred to as real hardware and real software in the following description.

The virtual assets indicate hardware of virtual, software of virtual and the like, which configure a virtual system built on real hardware or real software. The hardware of virtual and the software of virtual are sometimes referred to as virtual hardware and virtual software in the following description. For example, if the real hardware is a computer including a plurality of CPUs and if computing power of one CPU is assigned to the client A, virtual hardware of a virtual system 3a of the client A is a computer having the computing power of one CPU.

The real hardware includes computer devices such as a server, a storage etc., a network and the like. The real software is software such as an OS, middleware or the like installed on the real hardware in order to realize a virtual system.

The real hardware or the real software is not an asset of any one of users but an asset of a service provider that manages the system 1. Virtual hardware and virtual software, which realize a virtual system, and a transaction that is realized by using a virtual system and is a service for an end user are assets of each user.

In virtual hardware, virtual software is installed, and results of processing executed by the virtual software are provided to a transaction. For example, software that is an asset of an individual user, such as application software for a transaction, is equivalent to the virtual software. The transaction is, for example, a service for an end user rendered by each enterprise.

In the above described form, a plurality of virtual systems respectively used for a plurality of individuals and a plurality of enterprises are installed on hardware on a service providing side. Accordingly, a system administrator of the service providing side that is the system 1 needs to grasp virtual assets included in physical assets, i.e., virtual systems 3a, 3b and 3c of the respective users in addition to the management of the physical assets such as real hardware that configure the system 1. For example, a system using a virtualization technology such as cloud computing is used as the above described form. A virtual system is built with virtual hardware, virtual software and the like, and a configuration of the virtual hardware and the virtual software differs depending on a type of a transaction.

The virtual hardware and the virtual software, which configure the virtual system, are implemented by reflecting contents of a transaction used by each user. Accordingly, what virtual hardware and virtual software are used is internal information for each user. If the operating form of the system is, for example, a system closed within one enterprise, all of hardware, software and a transaction are assets managed under the enterprise. Therefore, there is no problem in that a system administrator of the system closed in one enterprise learns information about the assets.

However, for a virtual system built for each user in the above described system using a virtualization technology such as cloud computing or the like, a configuration of the virtual system is internal information of a user utilizing the virtual system. For example, virtual hardware, virtual software and a transaction, which configure the virtual system 3a, are internal information of the client A. Accordingly, even the system administrator of the system 1 that realizes the virtual system 3a should not unnecessarily learn contents of the virtual system 3a used by the client A. This is because if a certain person, for example, the system administrator of the system 1 learns information that is not needed, e.g., not required for system administration, the person can possibly leak the information by carelessness. Moreover, it can be considered that information not needed to be learned should not be notified unnecessarily.

For example, if receiving a request to change a transaction or a virtual system from the client A, or if maintaining hardware or software of the system 1, the system administrator of the system 1 examines whether or not to be able to continue a transaction used by the client A, and transactions respectively used by the client B and the client C. The administrator of the system 1 also examines whether or not to halt any of virtual systems. If any of the virtual systems is halted, the transaction realized by the virtual system cannot be continued as a matter of course. Namely, an extent of an influence exerted by a change operation or a maintenance operation is examined. If any influence is exerted on the continuation of the transaction, a notification needs to be made to each user influenced by the operation before the maintenance operation is performed. To implement this, it is desirable that the system administrator of the system 1 can easily grasp at least a virtual system and a transaction, which relate to an asset to be changed.

However, relationships among assets of a virtual system are multi-to-multi relationships and complicated as described above. Therefore, the administrator of the system 1 cannot easily grasp the relationships.

Accordingly, the present invention provides a technique that can output to a system administrator information of a relationship of a virtual system and a transaction, which relate to an asset to be changed, and can prevent the information about the asset from being output more than necessary.

FIG. 2 illustrates one implementation example of an asset managing apparatus. The asset managing apparatus includes an input unit 21, a processing unit 22, an output unit 23, and a recording unit 24.

The asset managing apparatus 20 may be any of computers that configure the system 1, or a computer communicatively connected to the system 1.

The input unit 21 is used to operate the asset managing apparatus by a user of the apparatus, such as a system administrator or the like. For example, the input unit 21 is an input device such as a keyboard, a mouse or the like. The input unit 21 accepts an asset to be examined (hereinafter referred to as a target asset), which is specified by a user such as a system administrator or the like, among information about assets.

The processing unit 22 includes a search extent setting unit 25, an extracting unit 26, and an output generating unit 27. The search extent setting unit 25 of the processing unit 22 identifies a layer made to correspond to a target asset by referencing an item attribute database 28 that is recorded in the recording unit 24 and will be described later. Thereafter, the search extent setting unit 25 of the processing unit 22 changes an extent for extracting information about other information technology assets made to correspond to the target asset according to a type of the layer of the target asset. Then, the extracting unit 26 of the processing unit 22 extracts other information technology assets having a relationship with the target asset based on the changed extent by referencing a binomial relationship database 29 and an attribute information database, which will be described later. The item attribute database 28 is sometimes referred to as a first database. The binomial relationship database 29 is sometimes referred to as a second database.

If the type of the layer of the target asset is equal to or higher than virtual hardware (namely, virtual hardware, virtual software and a transaction) when extracting another asset relating to the target asset, the extracting unit 26 extracts an asset that satisfies any of the following conditions a) to c) from among assets of the layers equal to or higher than the virtual hardware, and an asset that satisfies the following condition d) from among assets of a layer lower than the virtual hardware.

Here, the layers equal to or higher than the virtual hardware correspond to, for example in the layers in FIG. 3 explained later, a transaction layer that is a layer associated with an asset relating to a service for an end user, an application layer that is a layer associated with an asset relating to virtual software, and a virtual infrastructure layer that is an infrastructure layer being a layer associated with an asset relating to the virtual hardware. Namely, the layers equal to or higher than the virtual hardware are layers within the virtual system. The transaction layer is a layer higher than the application layer. The application layer is a layer higher than the virtual infrastructure layer. The virtual infrastructure layer is a layer higher than a physical infrastructure layer that is a layer made to correspond to an asset relating to real hardware and software. Accordingly, the physical infrastructure layer is equivalent to the layer lower than the virtual hardware.

a) All assets (output assets) of layers within a virtual system, which directly or indirectly use an output of a target asset.

b) All assets (input assets) of layers within the virtual system, which are directly or indirectly used by the target asset as an input.

c) All assets (relating assets) of layers within the virtual system, which use any of the input assets of b) and are different from the target asset.

d) All assets of the physical infrastructure layer, which are directly or indirectly used by any of the input assets of b) as an input.

Under the above described conditions a) to d), an asset relating via real hardware or real software is excluded from a search extent even if it has an input or output relationship with the target asset.

If the target asset is of a layer equal to or higher than the virtual hardware, namely, a layer within the virtual system, this means that an asset within the virtual system corresponding to one user is specified. Alternatively, if the target asset does not directly relate to a virtual system of other users, information about an asset of other users does not need to be output. To implement this, assets are traced and searched up to real software and real hardware, which directly or indirectly relate to the target asset. However, a search extent is set so that layers within a virtual system of other users using real software and real hardware are not traced by tracing back from the found real software and real hardware.

If the type of the layer of the target asset is a layer lower than the virtual hardware, namely, the physical infrastructure layer, the extracting unit 26 extracts an asset that satisfies any of the following conditions e) to g) from among assets of all the layers.

e) All assets (output assets) directly or indirectly using the output of the target asset.

f) All assets (input assets) directly or indirectly used by the target asset as an input.

g) All assets (relating assets) that use the input asset as an input and are different from the target asset.

If the target asset is the physical infrastructure layer, namely, real software or real hardware, all virtual systems operating on the real software or the real hardware have a relationship. Accordingly, all assets need to be searched regardless of an asset of which user. Therefore, all assets directly or indirectly relating to the target asset are set as a search extent.

As described above, a search extent is set according to a layer to which a target belongs when information relating to the target asset is output, thereby preventing information about other assets relating to the target asset from being output more than necessary.

In the following description, a layer within the virtual system is sometimes referred to as a first layer. Moreover, a layer lower than the virtual hardware, namely, the physical infrastructure layer is sometimes referred to as a second layer.

Note that the output generating unit 27 is not an essential component in the first embodiment. The output generating unit 27 will be described later. Functions of the processing unit 22 may be realized by using a CPU (Central Processing Unit), or a programmable device such as an FPGA (Field Programmable Gate Array), a PLD (Programmable Logic Device) or the like.

The output unit 23 is used by a user such as a system administrator or the like in order to operate the asset managing apparatus, or to display a relationship among assets. The output unit 23 is, for example, a liquid crystal monitor, a display device, a printer or the like.

In the recording unit 24, the item attribute database 28, the binomial relationship database 29, the linking attribute database 30, a layer database 31, a drawing database 32 and the like are recorded. In the recording unit 24, also programs, tables, data and the like, which are not illustrated, are recorded. The recording unit 24 is a memory such as a ROM (Read Only Memory), a RAM (Random Access Memory), a hard disk or the like. In the recording unit 24, also data such as parameter values, variable values and the like may be recorded. Alternatively, the recording unit 24 may be used as a working area.

The layer database 31 (see FIG. 4), the item attribute database 28 (see FIG. 5), the binomial relationship database 29 (see FIG. 6), and the linking attribute database 30 (see FIG. 7) are described with reference to FIGS. 3 to 7. Since the drawing database 32 is not an essential component in the first embodiment, it will be described later.

Figure 3:
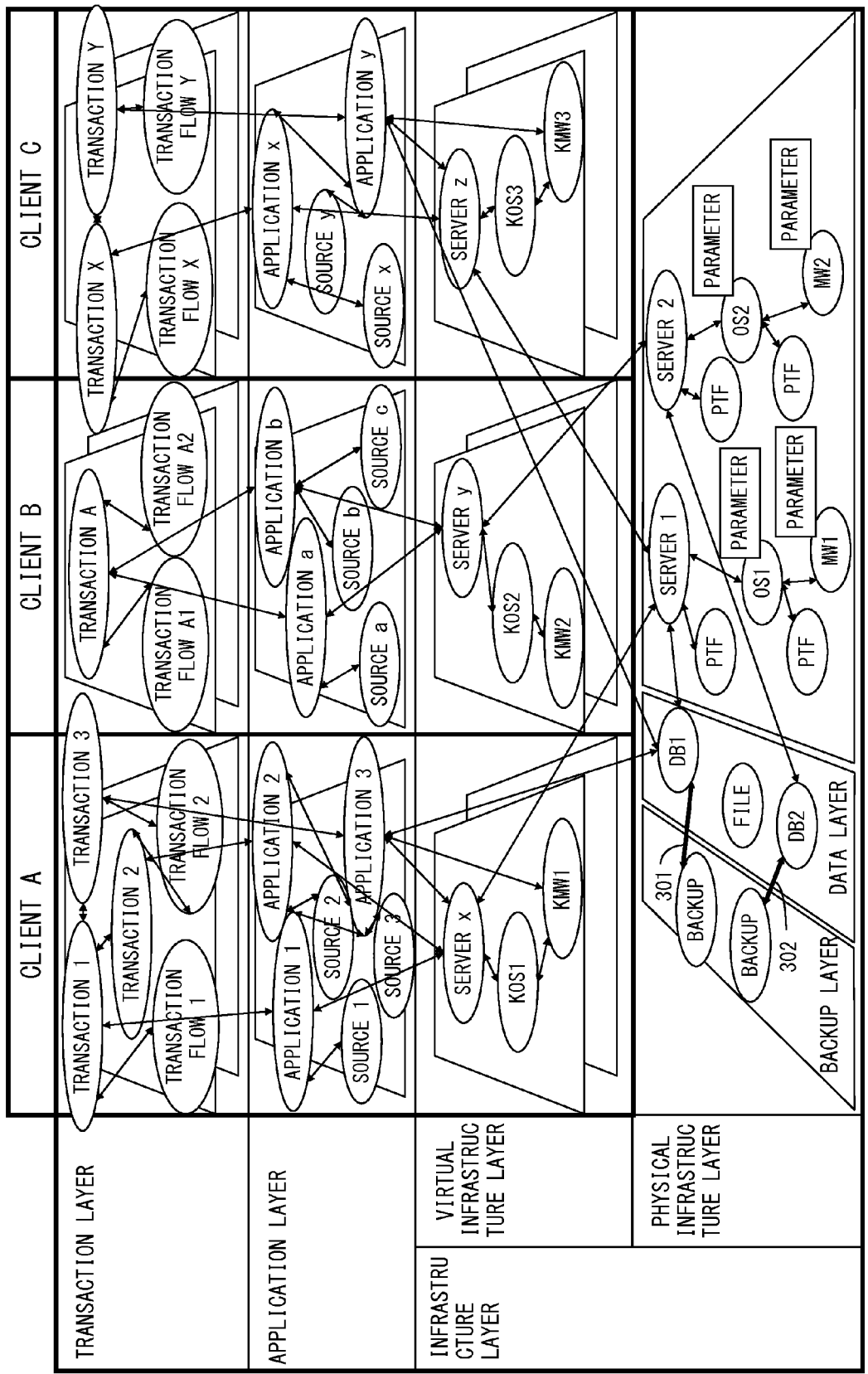
FIG. 3 illustrates one implementation example of layers to which hardware, software and transactions (services for an end-user) on a service providing side belong.

FIG. 3 illustrates one implementation example of layers to which hardware, software and transactions belong. FIG. 3 depicts a transaction layer, an application layer and an infrastructure layer as layers.

The infrastructure layer has a physical infrastructure layer and a virtual infrastructure layer. The physical infrastructure layer is a layer corresponding to the above described physical assets, and is equivalent to real hardware and real software of the system 1 that is a service providing side. In this example, the physical infrastructure layer includes a server 1, a server 2, OSs (Operating Systems) OS1 and OS2, middleware MW1, middleware MW2, and PTFs that are a program for fixing a bug of software, parameters, a data layer, a backup layer and the like. In the data layer, assets such as a database DB1, a database DB2, files and the like are recorded. The database DB1 exchanges data with the server 1, and records information. The database DB2 exchanges data with the server 2, and records information. The backup layer backs up information recorded in the database DB1 and the database DB2.

The virtual infrastructure layer is a layer corresponding to virtual assets, and includes virtual hardware of the system 1 that is the service providing side as described above. This example refers to a case where three virtual systems are present respectively for the clients A, B and C. In FIG. 3, three areas respectively enclosed with a thick line represent the individual virtual systems. For example, assets represented within each thick line frame that encloses the transaction layer, the application layer and the virtual infrastructure layer below the client A are equivalent to the assets within the virtual system layer of the client A.

In the virtual infrastructure layer of the virtual system corresponding to the client A, a server x, KOS (Virtual OS1), and KMW 1 (virtual middleware 1) are depicted. In the virtual infrastructure layer of the virtual system corresponding to the client B, a server y, KOS (virtual OS2), and KMW 2 (virtual middleware 2) are depicted as assets that are virtual hardware. In the virtual infrastructure layer of the virtual system corresponding to the client C, a server z, KOS3 (virtual OS3), and KMW3 (virtual middleware 3) are depicted as assets that are virtual hardware. Here, the assets of the virtual hardware include assets relating to a virtual device, and assets relating to virtual software for realizing a software environment where application software is operated. Arrows respectively connecting between the server x and the server 1, and between the server z and the server 1 represent that the server x and the server z are virtually realized by using the server 1 of the physical infrastructure layer. Similarly, the server y is virtually realized by using the server 2 of the physical infrastructure layer.

The application layer has assets that are virtual software as virtual assets as described above. In this example, assets such as the application 1, the application 2, the application 3, the source 1, the source 2 and the source 3 are represented as virtual software in the application layer of the virtual system corresponding to the client A. An arrow connecting between the application 1 and the server X indicates that the application 1 is installed on the server X. An arrow connecting between the application 1 and the source 1 indicates that a source program of the application 1 in an executable format is the source 1. An arrow connecting between the application 1 and the transaction 1 indicates that processing results of the application 1 are used by the transaction 1. Similarly, the application 2 is installed on the server x, its source program is the source 2, and processing results are used by the transaction 2. Similarly, the application 3 is installed on the server x, its source program is the source 3, and processing results are used in the transaction 3.

In the application layer of the virtual system corresponding to the client B, assets such as the application a, the application b, the source a, a source b and a source c are depicted as virtual software. The application a is installed on the server y, its source program is the source a, and processing results are used by the transaction A. The application b is installed on the server y, its source program is the source b and the source c, and processing results are used in the transaction A.

In the application layer of the virtual system corresponding to the client C, assets such as the application x, the application y, the source x and the source y are depicted as virtual software. The application x is installed on the server z, its source program is the source x, and processing results are used by the transaction X. The application y is installed on the server z, its source program is the source y, and processing results are used by the transaction Y.

The transaction layer indicates transactions respectively performed by the clients A, B and C. An arrow connecting between a transaction 1 and a transaction flow 1, which are assets of the transaction layer corresponding to the client A, indicates that the transaction 1 and the transaction flow 1 relate to each other. Each arrow connecting between the transaction 1 and the transaction 2 or the transaction 3 indicates that the transaction 1 relates to the transaction 2 or the transaction 3. An arrow connecting between the transaction 1 and the application 1 indicates that the application 1 executes the process of the transaction 1. Similarly, the transaction 2 relates to each of the transaction flow 2, the transaction 1 and the application 2. The transaction 3 relates to the transaction flow 2, the transaction 1 and the application 3.

The transaction A that is an asset of the transaction layer corresponding to the client B relates to each of the transaction flow A1, the transaction flow A2, the application a, and the application b. The transaction X in the transaction layer corresponding to the client C relates to each of the transaction flow X, the transaction Y and the application x. The transaction Y relates to each of the transaction flow Y, the transaction X and the application y.

As illustrated in FIG. 3, assets do not need to be only tangible hardware, and may include intangible assets such as a document, a source program, a transaction represented by a series of processes, which are to be managed by a system administrator in relation to software or virtual software installed in a virtual system.

FIG. 4 illustrates one implementation example of a data structure of the layer database 31.

To the layer database 31 (layer DB), information about layer relationships among layers to which assets belong are recorded. In this example, the layer relationships illustrated in FIG. 3 are respectively represented with "layer name", "attribute 1", "attribute 2" . . . "attribute n". As the "layer name", for example, a name, an identifier or the like for identifying a layer is used. In the example illustrated in FIG. 3, "transaction layer" that is a layer of a service for an end-user, "application layer" that is a layer of virtual software, and "infrastructure layer" that is a layer of virtual hardware, real hardware, and real software are recorded. Moreover, "backup layer" and "data layer" are recorded as the "layer name". In the example illustrated in FIG. 3, the "backup layer" and the "data layer" are included in the infrastructure layer. In contrast, these layers are represented as other layers in this example. Note that, however, the "backup layer" and the "data layer" may be represented as the "physical infrastructure layer". In this case, the "attribute 1" may indicate that these layers are the physical infrastructure. "attribute 1", "attribute 2", . . . , "attribute n" in FIG. 4 are used to indicate an attribute such as a name, an identifier or the like for partitioning and identifying a layer recorded to the "layer name". In this example, the infrastructure layer of FIG. 3 is managed by being partitioned into "physical infrastructure" and "virtual infrastructure". Therefore, the "physical infrastructure" and the "virtual infrastructure" are recorded to the "attribute 1" by being related to the two infrastructure layers. Note that the "physical infrastructure" indicates real hardware and real software in this example. The "virtual infrastructure" indicates virtual hardware virtually realized by real hardware and real software. Additionally, to the "layer name", the "transaction layer", the "application layer", the "virtual infrastructure", the "physical infrastructure", the "backup layer" and the "data layer" may be recorded. In this case, the "attribute 1" is not needed. Therefore, the "attribute 1", the "attribute 2" . . . , the "attribute n" do not need to be always provided in the layer database 31. The layer database 31 is considered to be created by an operator or a system administrator when the system is built. A way of partitioning layers stored in the layer database 31 may be suitably decided by the operator or the system administrator. That is, the way of partitioning layers may be decided as long as a layer to which assets of an individual user using a virtual system belong, and a layer other than the above layer, namely, a layer to which assets, such as real hardware, real software and the like being a basis for realizing a plurality of virtual systems, of an administrator of the asset managing apparatus 20 on a service providing side belong can be identified.

FIG. 5 illustrates one implementation example of a data structure of the item attribute database.

In the item attribute database 28 (item attribute DB), a plurality of attributes are recorded by being related to each piece of asset information. One record of the item attribute database 28 is equivalent to one asset. Accordingly, one record of the item attribute database 28 is equivalent to one individual asset represented by being enclosed with a circle or a square in FIG. 3. In this example, the item attribute database 28 includes "entity name", "entity identifier", "attribute 1 (layer)", "attribute 2 (client name)", . . . , "attribute n".

To the "entity name", a name of an asset is recorded. In this example, the "transaction 1", the "transaction Y", the "transaction flow 1", the "application 1" and the like, which are illustrated in FIG. 3, are recorded. To the "entity identifier", an identifier that can uniquely identify an asset is recorded. In this example, "E001", "E002", "E003" and "E004" are respectively recorded by being related to the "transaction 1", the "transaction Y", the "transaction flow 1" and the "application 1".

As information recorded to the entity name or the entity identifier, the asset managing apparatus 20 may extract and record information of real hardware or real software possessed by the system 1 or a user may input the information via the input unit 21 before a process represented by a flowchart to be described later is executed by the asset managing apparatus 20.

To the attribute items, information about a layer, information indicating an asset of which user, and the like can be recorded. To the "attribute 1", an attribute relating to a layer is recorded. In this example, the "transaction layer" is recorded by being respectively related to the "transaction 1", the "transaction Y" and the "transaction flow 1", which are illustrated in FIG. 3, and the "application layer" is recorded by being related to the "application 1". To the "attribute 2", an attribute relating to a client is recorded. In this example, the "client A" is recorded by being respectively related to the "transaction 1", the "transaction flow 1" and the "application 1", which are illustrated in FIG. 3, and the "transaction Y" is recorded by being related to the "client C". An operator (or a system administrator) can possibly create the item attribute database 28 when building the system. However, attributes (attributes 3 to n) subsequent to the attribute 2 do not need to be always provided.

As information recorded to the attribute 1 and the attribute 2, the asset managing apparatus 20 may extract and record information stored when a virtual system for each user is built in the system 1 or a user may input the information via the input unit 21 before the process represented by the flowchart to be described later is executed by the asset managing apparatus 20.

In the example illustrated in FIG. 5, in the first record, an entity identifier of an asset having an entity name the "transaction 1" is "E001", its attribute 1 is the "transaction layer", and its attribute 2 is the "client A".

FIG. 6 illustrates one implementation example of a data structure of the binomial relationship database.

The binomial relationship database 29 (binomial relationship DB) is a database indicating information about relationships possessed by a plurality of assets recorded in the item attribute database 28. In this example, the binomial relationship database 29 includes "entity identifier (parent)", "linking identifier", "entity identifier (child)", "binomial relationship attribute 1 (registration date)", . . . , "binomial relationship attribute n".

To the "entity identifier (parent)", an identifier of an entity that is a parent in a binomial relationship is recorded. In this example, to the "entity identifier (parent)", "E001", "E001", "E004", "E004", "E009" and the like are recorded. Note that, for example, (transaction 1), (application 1) and the like do not need to be recorded in this item although they are depicted in this figure for the sake of convenience.

The "linking identifier" indicates a relationship between a parent and a child of an information technology asset corresponding to the entity identifier. In this example, "L003" and the like to be described later are recorded to the "linking identifier". Note that, for example, "reference", "include", "read" and the like do not need to be recorded in this item although they are depicted for the sake of convenience.

To the "entity identifier (child)", "E003", "E004", "E008", "E005", "E004" and the like are recorded. Note that, for example, the "transaction flow 1", the "application 1", the "source 1" and the like do not need to be recorded in this item although they are depicted for the sake of convenience. To the "binomial relationship attribute 1 (registration date)", for example, registration date and time of a binomial relationship is recorded. In this example, "2009.02.22", "2008.06.01", "2009.10.01" and the like are recorded as the registration date and time. However, "binomial relationship attribute 1", . . . , "binomial relationship attribute n" do not need to be always provided.

As the information recorded in the binomial relationship database 29, the asset managing apparatus 20 may extract and record information stored when a virtual system for each user is built in the system 1 or a user may input the information via the input unit 21 before the process represented by the flowchart to be described later is executed.

In the example illustrated in FIG. 6, the first record indicates that "entity identifier (child)" of an asset having an entity identifier (parent) "E001" is "E003", and a linking identifier of the entity identifier (child) for the entity identifier (parent) is "L003".

FIG. 7 illustrates one implementation example of a data structure of the linking attribute database 30.

To the linking attribute database 30, relationships indicated by the linking identifiers that represent the above described parent-child relationships of the entity identifiers are recorded. In this example, the linking attribute database 30 includes "linking name", "linking identifier", "linking attribute 1 (registration date)", "linking attribute 2 (note)", . . . , "linking attribute n". To the "linking name", for example, "read", "write", "reference", "include" and the like are recorded.

"read" indicates a relationship with which an asset represented as a parent operates by reading an asset represented as a child. For example, FIG. 6 depicts that the application 3 having the entity identifier "E005" reads data from the database DB1 having the entity identifier "E014".

"write" indicates a relationship with which an asset represented as a parent writes data to an asset represented as a child. For example, FIG. 6 depicts that the application a having the entity identifier "E006" writes data to the database DB2.

"reference" indicates a relationship to be related and managed as a material although it does not directly relate to an actual operation of a computer, such as a relationship between application software and a document such as a source program, specifications or the like. For example, FIG. 6 depicts that the transaction flow 1 having the entity identifier "E003" is present as a document relating to the transaction 1 having the entity identifier "E001".

"include" indicates a relationship with which an asset represented as a parent includes an asset represented as a child or an asset represented as a child is realized by using part of an asset represented as a parent. For example, FIG. 6 depicts that the server 1 having the entity identifier "E013" includes the database DB1 having the entity identifier "E014", or the server x having the entity identifier "E009" is realized by the server 1 having the entity identifier "E013".

Linking made among assets are not limited to the above described "read", "write", "reference" and "include".

To the "linking identifier", for example, "L001", "L002", "L003" and "L004" are respectively recorded by being related to "read", "write", "reference" and "include".

To the "linking attribute 1 (registration date)", registration date and time when a record is registered is recorded. To the "linking attribute 2 (note)", a note is recorded. As the "note", "xxx", "yyy", "zzz", "aaa", . . . are recorded for the sake of convenience. However, the "linking attribute 1", the "linking attribute 2", . . . , the "linking attribute n" do not need to be always provided.

As information recorded to the linking attribute database 30, a user may input information via the input unit 21 before the process represented by the flowchart to be described later is executed by the asset managing apparatus 20.

Figure 9:
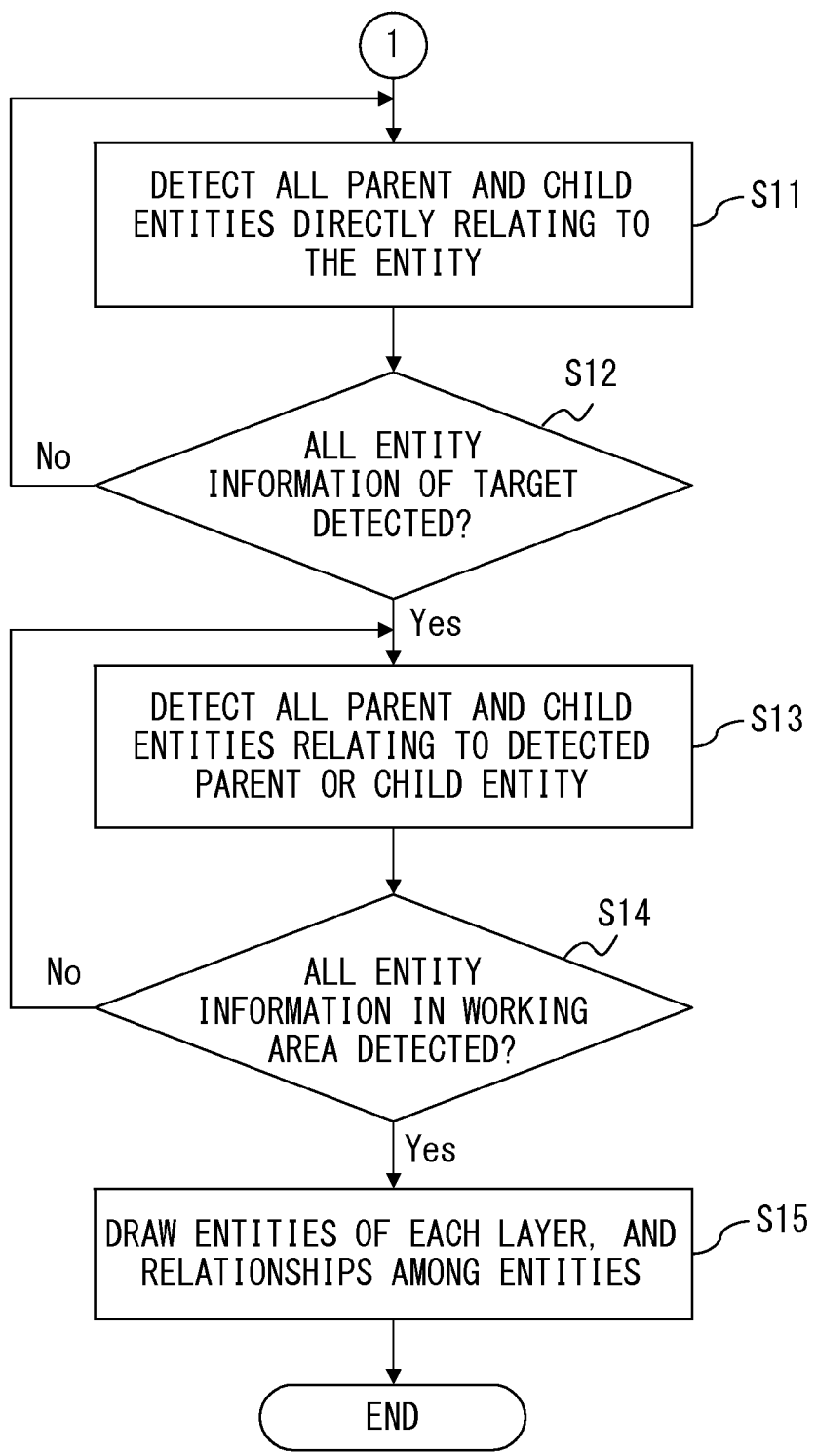
FIG. 9 is a flowchart illustrating one implementation example of operations of the asset managing apparatus.

FIGS. 8 and 9 are flowcharts illustrating one implementation example of operations of the asset managing apparatus.

In step S1, the search extent setting unit 25 obtains an identifier or the like of an entity of a target asset that is a starting point as information indicating the target asset which is specified by a user (system administrator) and an influence extent of which is to be searched. The target asset is sometimes referred to as a starting point entity in the following description.

For example, assets that are candidates of the target asset are output to the output unit 23 as a graphic or a list as a screen according to a use privilege of a user, and the search extent setting unit 25 obtains an entity identifier of an asset that a user has input via the input unit 21 in response to the output. If the user is a user belonging to the client A, a screen that outputs assets within the virtual system of the client A as candidates of the target asset is considered as an example of the screen according to the user privilege of the user. Alternatively, if the user is a system administrator of the system 1, a screen that outputs assets of the physical infrastructure layer and those of the virtual infrastructure layer as candidates of the target asset is considered. The user performs an operation for designating an asset to be set as the target asset. Naturally, the user may explicitly input to the input unit 21 information identifiable for the target asset.

In S2, the search extent setting unit 25 detects attribute information of the obtained target asset from the item attribute database 28 recorded in the recording unit 24. For example, the search extent setting unit 25 detects the attribute information of the obtained information by searching for the item attribute database 28 with the use of the transaction 1 (E001) if obtaining the transaction 1 (entity identifier: E001) in step S1. Here, the attribute information of the transaction 1 (E001) is the transaction layer of the attribute 1, and the client A of the attribute 2.

In step S3, the search extent setting unit 25 determines whether or not the information of the target asset belongs to the physical infrastructure layer of the infrastructure layer. If the information belongs to the physical infrastructure layer ("YES" in step S3), the flow goes to step S11. If the information belongs to a layer other than the physical infrastructure layer ("NO" in step S3), the flow goes to step S4. The layer other than the physical infrastructure layer is the virtual infrastructure layer of the infrastructure layer, the application layer, or the transaction layer.

For example, if the server 1 (entity identifier: E013) is obtained in step S1, the infrastructure layer (physical infrastructure) of the attribute 1 is detected from the item attribute database 28 of FIG. 5 in step S2. Then, the flow goes to step S11. If the application 1 (entity identifier: E004) is obtained in step S1, the application layer of the attribute 1 is detected from the item attribute database 28 of FIG. 5 in step S2. Then, the flow goes to step S4.

As described above, in step S3, the search extent setting unit 25 sets an extent for extracting information about other assets that relate to a target asset and is associated with the target asset by the linking identifier such as "read", "write", "reference" or "include" in the binomial relationship database 29 according to a layer of the target asset.

steps S4 to S10 are processes executed when a layer including the target asset obtained in step S1 is a layer other than the physical infrastructure.

In steps S4 and S5, all assets (output assets) directly using an output of the target asset, and all assets (input assets) directly used by the target asset as an input are extracted.

In step S4, the extracting unit 26 detects other assets directly relating to the target asset in the binomial relationship database 29 among assets having an attribute 1 other than the physical infrastructure layer. An entity identifier (child) in a record where the entity identifier of the target asset is stored as an entity identifier (parent) corresponds to another asset. As described above, when attention is focused on a certain asset, an asset recorded as an entity identifier (child) for the certain asset in the binomial relationship database 29 is sometimes referred to as a child entity in the following description.

Also an entity identifier (parent) in a record where the entity identifier of the target asset is stored as an entity identifier (child) corresponds to another asset. As described above, when attention is focused on a certain asset, an asset recorded as an entity identifier (parent) for the certain asset in the binomial relationship database 29 is sometimes referred to as a parent entity in the following description.

In step S5, it is determined whether or not the extracting unit 26 has detected all parent entity identifiers and child entity identifiers, which are assets other than the physical infrastructure layer and relate to the target asset. If the extracting unit 26 has detected all the identifiers ("YES" in step S5), the flow goes to step S6. Alternatively, if the extracting unit 26 has not detected all the identifiers yet ("NO" in step S5), the flow goes back to step S4.

The determination of step S5 is performed, for example, by sequentially searching for the "entity identifier (parent)" and the "entity identifier (child)" from the first record in the binomial relationship database 29. Namely, if there is the same entity identifier as the target asset, a relating parent entity other than the physical infrastructure layer or a child entity other than the physical infrastructure layer is detected and recorded to the recording unit 24. Upon completion of searching for all the "entity identifier (parent)" and the "entity identifier (child)" in the binomial relationship database 29, it is determined that all the parent entities and child entities, which relate to the target entity, other than the physical infrastructure layer have been detected. However, the determination of whether or not parent entities and child entities other than the physical infrastructure have been detected is not limited. The determination may be performed with another method as long as all the parent entities and the child entities, which relate to the target entity, other than the physical infrastructures can be detected.

In steps S4 and S5, for example, if the application 3 of the application layer illustrated in FIG. 3 has been obtained in step S1, "E005" is recorded to the "entity identifier" in the item attribute database 28. Moreover, the "application layer" and the "client A" are respectively recorded to the "attribute 1" and the "attribute 2" in a temporary storage area of the recording unit 24. In step S4, a parent entity or a child entity relating to "E005" is detected by searching for the "entity identifier (parent)" and the "entity identifier (child)" in the binomial relationship database 29 by using "E005", and the detected entities are recorded in a temporary storage area or the like of the recording unit 24. In this example, in steps S4 and S5, the server x and the KMW1 of the virtual infrastructure layer, the source 3, the application 1 and the application 2 of the application layer, and the transaction 3 of the transaction layer in FIG. 3 are detected from the layers relating to the application 3 other than the physical infrastructure layer illustrated in FIG. 3. Note that all the relationships among the above described assets are actually recorded although they are not depicted in the binomial relationship database 29 of FIG. 6 for the sake of convenience.

In steps S6 and S7, all information technology assets (output assets) indirectly using an output of the target asset, and all information technology assets (input assets) indirectly used by the target asset as an input are extracted. Moreover, all (excluding other information technology assets via real hardware and real software) information technology assets (relating assets) different from the target asset that uses the input asset as an input are extracted.

In step S6, a parent entity and a child entity, which have an attribute of a layer other than the physical infrastructure layer and directly or indirectly relate to the parent entity or the child entity that the extracting unit 26 has detected in step S4 or S5 are detected by using the binomial relationship database 29 and the item attribute database 28. In step S7, it is determined whether or not all parent entities and child entities, which relate to the parent entity or the child entity that the extracting unit 26 has detected in step S4 or S5 and have an attribute of a layer other than the physical infrastructure layer.

The determination process executed in step S7 is described. For example, the parent entities and the child entities, which have been recorded in steps S4 and S5, are sequentially searched in an order recorded in the recording unit 24.

The "entity identifier (parent)" and the "entity identifier (child)" are sequentially searched from the first record in the binomial relationship database 29 for each of the parent entities and the child entities, which have been recorded in steps S4 and S5. Namely, an entity identifier that is recorded in the item of the entity identifier (parent) and has an attribute of a layer other than the physical infrastructure layer in a record where the same entity identifier as each of the parent entities and the child entities, which have been recorded in steps S4 and S5, is recorded in the item of the entity identifier (child) is detected as a parent entity. Moreover, an entity identifier that is recorded in the item of the entity identifier (child) and has an attribute of a layer other than the physical infrastructure layer in a record where the same entity identifier as each of the parent entities and the child entities, which have been recorded in steps S4 and S5, is recorded in the item of the entity identifier (parent) is detected as a child entity.

The process of step S6 is repeated based on the parent entity and the child entity, which have been detected in step S6. Namely, other entities relating to the parent entity detected in step S6, and other entities relating to the child entity detected in S6 are detected. The process of step S6 is repeated until no more relating entities are detected, so that other entities indirectly relating to the target asset are detected. Then, entity identifiers of all the parent and child entities detected in step S6 are recorded in a temporary storage area of the recording unit 24.

Upon completion of searching for all the "entity identifier (parent)" and the "entity identifier (child)" in the binomial relationship database 29 for each of the parent entities and the child entities, which have been recorded in steps S4 and S5, it is determined that all related entities have been detected in step S7. However, the determination of whether or not parent entities and child entities in the layers other than the physical infrastructure layer have been detected is not limited. The determination may be performed with another method as long as all relating parent entities and child entities other than the physical infrastructure can be detected.

Assume that the server x and the KMW1 of the virtual infrastructure layer, the source 3, the application 1 and the application 2 of the application layer, and the transaction 3 of the transaction layer have been detected from the layers, which relate to the application 3 illustrated in FIG. 3, other than the physical infrastructure layer in steps S4 and S5. In this case, the processes in steps S6 and S7 are executed for each of the detection results.

For example, if a directly or indirectly relating parent entity or child entity in layers other than the physical infrastructure layer is detected for the server x by using the binomial relationship database 29 and the item attribute database 28, the application 1, the application 2, the KOS1, and the application 3 are detected as directly relating assets (entities). Moreover, the source 1, the application 3, the transaction 1 and the like are detected as assets (entities) relating to the application 1, namely, assets (entities) indirectly relating to the server x. If an indirectly relating asset is further present, detection is continued by tracing a relationship until no more relating asset is found. For the KMW1 of the virtual infrastructure layer, the KOS1 and the server x are detected.

Similarly, a directly or indirectly relating parent entity or child entity that is an asset (entity) other than the physical infrastructure layer is detected also for the source 3, the application 1, and the application 2 of the application layer, and the transaction 3 of the transaction layer. As a result, assets of the client A, which relate to the application 3 being the target asset and are included in the transaction layer, the application layer and the virtual infrastructure layer, and relationships (linking) among the respective assets are clarified.

Accordingly, an asset that satisfies any of the above described conditions a) to c) can be extracted from among the assets of the layers other than the physical infrastructure layer, which correspond to one client, namely, the layers within a virtual system. All the above described relationships are actually recorded in the binomial relationship database 29 of FIG. 6 although they are not depicted for the sake of convenience.

In steps S8 and S9, all assets of the physical infrastructure layer, which are directly or indirectly used by the input asset, are extracted.

In step S8, the extracting unit 26 detects a parent entity and a child entity, which relate to the parent entity or the child entity that the extracting unit 26 has detected in step S4 or S6 and have an attribute of a layer in the physical infrastructure layer, are detected by using the binomial relationship database 29 and the item attribute database 28. Here, if identical entity identifiers have been detected in step S4 or S6, this means that a plurality of identical entity identifiers are recorded in the recording unit 24. If there are a plurality of identical entity identifiers, the process may be executed by collectively regarding the entity identifiers as one piece of information.

In step S9, it is determined whether or not all parent entities and child entities of the physical infrastructure layer, which relate to the parent entity or the child entity that the extracting unit 26 has detected in step S6 or S7, have been detected.

The determination of whether or not all the parent entities and child entities, which relate to the parent entity and the child entity detected in step S6 or S7, have been detected is described. The "entity identifier (parent)" and the "entity identifier (child)" in the binomial relationship database 29 are sequentially searched from the first record in an order recorded in the recording unit 24 for each of the parent entity and the child entity, which have been recorded in step S6 or S7. Namely, an entity identifier (parent) recorded to the entity identifier (parent) is detected if an entity identifier (parent) in a record where the same entity identifier as each of the parent entity and the child entity, which has been recorded in step S4 or S6, is stored as the entity identifier (child) is an asset having an attribute of a layer of the physical infrastructure layer. Moreover, an entity identifier recorded to the entity identifier (child) is detected if an entity identifier (child) in a record where the same entity identifier as each of the parent entity and the child entity, which have been recorded in step S4 or S6, is stored as the entity identifier (parent) is an asset having an attribute of a layer of the physical infrastructure layer. Then, the detected entity identifiers are recorded to the recording unit 24.

Upon completion of searching for all the "entity identifier (parent)" and the "entity identifier (child)" in the binomial relationship database 29 for each of the parent entity and the child entity, which are recorded in step S4 or S6, it is determined that all relating entity identifiers have been detected. However, the determination of whether or not parent entities and child entities of the physical infrastructure layer have been detected is not limited. The determination may be performed with another method as long as all relating parent entities and child entities of the physical infrastructure can be detected.

Assume that assets included in the transaction layer, the application layer and the virtual infrastructure layer of the client A of FIG. 3, and relationships (linking) among the assets are clarified in steps S4 and S6. If the processes of steps S8 and S9 are executed, it is proved that the application 3 of the client A relates to the database DB1 of the physical infrastructure layer and the server x relates to the server 1 of the physical infrastructure as illustrated in FIG. 3. Namely, the assets that satisfy the above described condition d) can be detected from among the assets of the physical infrastructure layer.

In the above described processes of steps S1 to S9, if the target asset is of a layer other than the physical infrastructure layer, namely, a layer equal to or higher than the virtual infrastructure layer, this means that an asset corresponding to one client is specified as the target asset. Although assets may be searched up to real software and real hardware, which relate to the target asset, a search extent is set so that the layers equal to or higher than the virtual hardware layer of another enterprise are not traced by tracing back from the found real software and real hardware. As a result, information about assets of another enterprise can be prevented from being output.

For example, both the application 3 of the client A and the application y of the client C, which are illustrated in FIG. 3, utilize the database DB1. Namely, the application 3 and the application y are assets that indirectly relate to each other via the database DB1. If a search is started at the application 3 without restricting a search extent, the application y relating to the database DB1 is also recognized as a search target when the database DB1 relating to the application 3 is detected. Accordingly, also the application y that is an asset of the client C is output as a search result although assets relating to the application 3 of the client A are desired to be output. It can be said that the output of the information about the asset that is internal information of the client C to a system administrator of the client A is more than necessary. However, according to this embodiment, the application y relating to the application 3 via the database DB1 does not apply to any of the conditions a) to d) even if the database DB1 relating to the application 3 has been detected. Namely, since the application y is not included in the search extent, it is not detected. Accordingly, the information about the asset of the client C can be prevented from being output to the system administrator of the client A more than necessary. In other words, an asset of a user other than a particular user can be prevented from being included in results of a search performed for other assets relating to an asset of the particular user as a target asset.

In step S10, the output generating unit 27 draws entities of each layer, and a relationship among entities based on the entity identifiers recorded in the recording unit 24 respectively in steps S4, S6 and S8. The output generating unit 27 will be described later. The process of the output generating unit 27 is not essential in the first embodiment.

steps S11 to S15 of FIG. 9 are processes executed if a layer recorded as the attribute of the target asset obtained in step S1 is the physical infrastructure layer.

In steps S11 and S12, the extracting unit 26 extracts all assets (output assets) directly using an output of the target asset, and all assets (input assets) directly used by the target asset as an input.

In step S11, the extracting unit 26 detects a parent entity and a child entity, which directly relate to the target asset, by using the binomial relationship database 29 and the item attribute database 28. In step S12, it is determined whether or not the extracting unit 26 has detected all parent entities and child entities, which relate to the target entity. If it is determined that all the entities have been detected ("YES" in step S12), the flow goes to step S13. Alternatively, if it is determined that all the entities have not been detected yet ("NO" in step S12), the flow goes back to step S11.

The determination of whether or not parent entities and child entities have been detected is performed, for example, by sequentially searching for the "entity identifier (parent)" and the "entity identifier (child)" from the first record in the binomial relationship database 29. Namely, an entity identifier recorded to the entity identifier (parent) in a record where the same entity identifier as the target asset is recorded to the entity identifier (child) is detected as a parent entity. Moreover, an entity identifier recorded to the entity identifier (child) in a record where the same entity identifier as the target asset is recorded to the entity identifier (parent) is detected as a child entity. Then, the detected parent entity and child entity are recorded to the recording unit 24.

Upon completion of searching for all the "entity identifier (parent)" and the "entity identifier (child)" in the binomial relationship database 29, it is determined that all the parent entities and the child entities, which relate to the target entity, have been detected. However, the determination of whether or not parent entities and child entities have been detected is not limited. The determination may be performed with another method as long as all parent entities and child entities, which relate to the target entity, can be detected.

In steps S11 and S12, for example, if the database DB1 of the physical infrastructure, which is illustrated in FIG. 3, is obtained in step S1, "E014" of the "entity identifier" in the item attribute database 28 is recorded to the recording unit 24 or the like. Moreover, the "infrastructure layer (physical infrastructure)" of the "attribute 1" is recorded to the recording unit 24 or the like. In step S11, the "entity identifier (parent)" and the "entity identifier (child)" in the binomial relationship database 29 are searched by using "E014", and a parent or child entity relating to "E014" is detected and recorded to the recording unit 24 or the like.

In this example, one Backup of the backup layer and the server 1 of the physical infrastructure, which are illustrated in FIG. 3, are detected from the physical infrastructure layer relating to the database DB1 illustrated in FIG. 3. Note that all the above described relationships are actually recorded although they are not depicted in the binomial relationship database 29 of FIG. 6 for the sake of convenience.

In steps S13 and S14, all assets (output assets) having a relationship of indirectly using the output of the target asset, and all assets (input assets) having a relationship of being indirectly used by the target asset as an input are extracted. Also an asset that uses the input asset as an input and is different from the target asset, and all other assets having a relationship with the different asset are extracted.

In step S13, a parent entity and a child entity, which directly or indirectly relate to the parent entity or the child entity, which has been detected by the extracting unit 26 in step S11, are detected by using the binomial relationship database 29 and the item attribute database 28.

In step S14, it is determined whether or not the extracting unit 26 has detected all parent entities and child entities, which directly relate to the parent entity or the child entity detected in step S11 or S12. The determination of whether or not all parent entities and child entities, which directly relate to the parent entity or the child entity detected in step S11 or S12, have been detected is described. The "entity identifier (parent)" and the "entity identifier (child)" in the binomial relationship database 29 are searched from the first record in an order where each of the parent entities and the child entities, which have been recorded in step S11 or S12, are recorded. Namely, if there is the same entity identifier as each of the parent entity and the child entity, which has been recorded in step S11 or S12, a relating parent entity or child entity is detected and recorded to the recording unit 24. How to detect a parent entity or a child entity, which relates to a focused asset, is similar to step S11. Upon completion of searching for all the "entity identifier (parent)" and the "entity identifier (child)" in the binomial relationship database 29 for each of the parent entity and the child entity, which has been recorded in step S11 or S12, it is determined that all relating entities have been detected. However, the above described determination of whether or not all parent entities and child entities have been detected is not limited. The determination may be performed with another method as long as all relating parent entities and child entities can be detected.

In steps S11 and S12, if a layer recorded to the attribute of the target asset is the physical infrastructure layer ("YES" in step S3), an asset that satisfies any of the above described conditions e) to g) is extracted from among the assets of all the layers. If the target asset is of the physical infrastructure layer, namely, real software or real hardware, and if any change operation is performed for the real software or the real hardware, this change influences all virtual systems operating on the real software or the real hardware. Accordingly, the search needs to be performed regardless of an asset of which client. Therefore, all assets directly or indirectly relating to the target asset are set as a search extent.

In step S15, the output generating unit 27 draws entities of each layer, and also draws relationships among the entities. The output generating unit 27 will be described later. The process of the output generating unit 27 is not essential in the first embodiment.

In recent years, the demand for promoting cost reductions and measures taken for internal control has been increasing. Therefore, the number of enterprises that push forward a construction of an intra-enterprise data center for centralizing and integrally managing information technology assets has been growing. If attempts are made to effectively utilize assets, such as to centralize assets in a data center, to virtualize a server and the like, a burden on operations in the data center seems to become heavier than that in conventional techniques. By way of example, for application operations, management and operations of application assets, which are conventionally performed within one enterprise, are centralized on a computer within the data center, whereby the management work and the operations are transferred to a responsible person of the data center. Accordingly, a burden on the operations of the responsible person of the data center increases. Moreover, since a plurality of enterprise systems are virtually built in one system, an application execution environment becomes complicated. Accordingly, the responsible person of the data center needs a lot more management know-how of the execution environment. In addition, since many operations dependent on a person are needed to change an application, also a serious trouble possibly caused by an operation failure is concerned.

For example, a zip code, and EAN (European Article Number) code or JAN (Japanese Article Number) code and the like, which is attached to a commodity product, are data not unique to an enterprise but common to enterprises. In the data center, it is considered that common data is prestored to enhance the convenience of enterprises. Namely, a plurality of enterprises sometimes use the same common data.

In this embodiment, since such common data is data that is not an asset of any enterprise, it is regarded as real software (physical infrastructure layer).

Assume that the application 3 of the client A is application software using common data and belongs to the application layer. Also assume that common data is stored in the database DB1. Then, a case where the application 3 is specified as a target asset is considered. A user who focuses attention on the application A of the client A can be considered as a user who is to learn information about the client A, namely, a user to whom information other than the client A is not to be notified unnecessarily.

When the application 3 is specified as a target asset, the database DB1 that is common data is extracted as an input asset of the application 3. If a relating asset is simply extracted as in conventional techniques, also the application y of the client C using the common data is extracted.

In the meantime, by using the above described processes of steps S1 to S9, the asset (the application y of the client C) that is different from the application 3 of the target asset using as an input the database DB1 being common data is not included in the search extent. Accordingly, information about the application of the client C using the common data can be prevented from being output to a user. As a result, the information of the client C can be prevented from being output to a user to whom information other than the client A is not to be notified.

A modification example is described.

A method for displaying a relationship among assets to be easily understandable based on extraction results that are extracted by the processing unit 22 and recorded in the recording unit 24 by using the output generating unit 27 is described. One implementation example of steps S10 and S15 is described.

Figure 10:
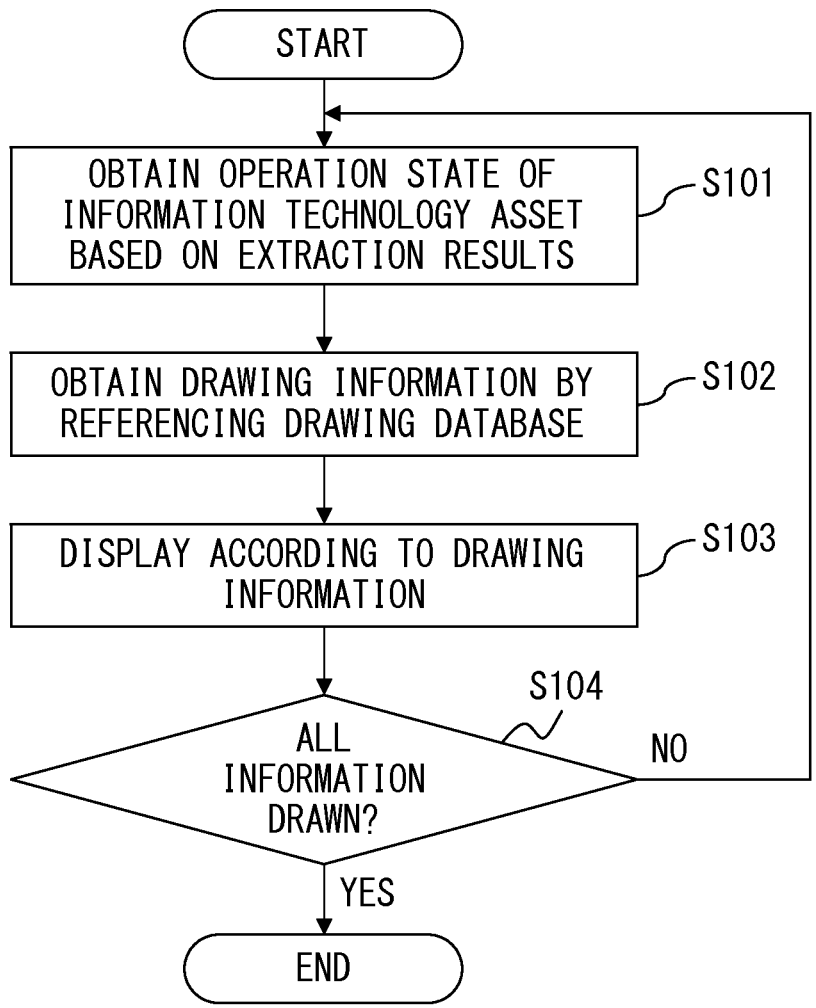
FIG. 10 is a flowchart illustrating one implementation example of operations of an output generating unit.

FIG. 10 illustrates one implementation example of a process for displaying a relationship among assets to be easily understandable.

In step S101, the output generating unit 27 obtains an operation state of each asset included in extraction results after obtaining the results extracted by the extracting unit 26. Here, the operation state is, for example, a log that records data exchanges among the assets included in the extraction results, such as the amount of data, the number of accesses, or the like.

In step S102, the output generating unit 27 obtains drawing information by referencing the drawing database 32 with the use of the information of the operation states that the output generating unit 27 has obtained in step S101. A magnification table, a path definition table 1 and a path definition table 2, which are illustrated in FIGS. 11 to 13 and recorded in the drawing database 32, are described.

Figure 11:
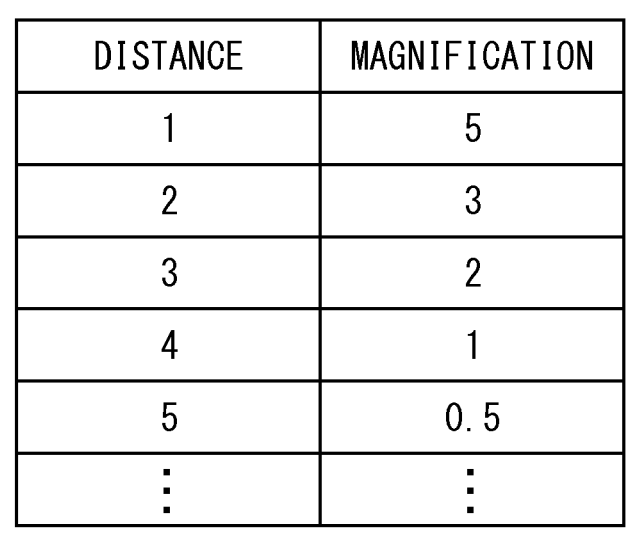

FIG. 11 illustrates one implementation example of a data structure of the magnification table. The magnification table includes data items such as "distance" and "magnification" as drawing information. The "distance" indicates a relationship of a distance between a target asset and another asset detected. In this example, a distance to another asset having a parent-child relationship with the target asset is assumed to be "1", and a distance to still another asset further having a parent-child relationship with each of a parent entity and a child entity of the target asset is assumed to be "2". Namely, a distance is increased as an entity to be examined further separates. "1", "2", "3", "4", "5", . . . are depicted in FIG. 11.

The "magnification" is a value used to determine a size when a display item (such as each asset represented with an ellipse in FIG. 3) corresponding to an asset that corresponds to the "distance". In this example, "5", "3", "2", "1", "0.5", . . . are depicted. For example, "5" indicates that an item is displayed five times a standard size.

FIG. 12 illustrates one implementation example of a data structure of the path definition table 1. The path definition table 1 includes data items such as "data amount" and "path thickness" as drawing information. To the "data amount", the amount of data exchanged per unit time between assets is recorded. In this example, "10,000 or more", . . . , "1,000 or more", . . . , "100 or more" are recorded. To the "path thickness", a thickness of a path (segment (arrow) depicted in FIG. 3) is indicated in relation to the "data amount". In this example, "20 points", . . . , "10 points", . . . , "5 points" are recorded.

FIG. 13 illustrates one implementation example of a data structure of the path definition table 2. The path definition table 2 includes data items such as "number of accesses" and "path color" as drawing information. To the "number of accesses", the number of accesses made to an asset, for example, per day is recorded. In this example, "1,000,000 or more/day", . . . , "10,000 or more/day", . . . , "100 or more/day" are recorded. To the "path color", a color of a path (segment (arrow) illustrated in FIG. 3) is indicated in relation to the "number of accesses". In this example, "red", . . . , "yellow", . . . , "blue" are recorded.

However, the tables illustrated in FIGS. 11 to 13 are merely one example, and not limited.

In step S103, the output generating unit 27 causes the output unit 23 to make a display by using the drawing information obtained in step S102. For example, a relationship among assets is three-dimensionally displayed according to the layer relationship illustrated in FIG. 3. For example, a segment connecting between assets having a large amount of data communication is displayed with a thick line like paths 301 and 302 illustrated in FIG. 3 by referencing the path definition table 2.

In step S104, it is determined whether or not the output generating unit 27 has drawn information for all assets included in the extraction results. If the information has been drawn for all the assets, this process is completed. Alternatively, if an asset to be drawn is left, the flow goes back to step S101.

As described above, a relationship among assets can be displayed to be easily understandable at a glance by using the output generating unit 27. Accordingly, a system administrator can accurately grasp a relationship of each asset. As a result, a notification to a concerned person, and operations for updating hardware or software can be properly performed. Note that the above described functions can be possibly used as part of an asset management tool in a data center.

Additionally, if a plurality of system administrators are present, a privilege of each of the system administrators is identified, and only information of a client in the charge of each of the system administrators may be displayed. In the example illustrated in FIG. 3, if a client in the charge of a certain system administrator is the client A, a portion related to information technology assets of the clients B and C is not displayed for the system administrator more than necessary.

A configuration in a case where this embodiment is realized as a computer is described.

Figure 14:
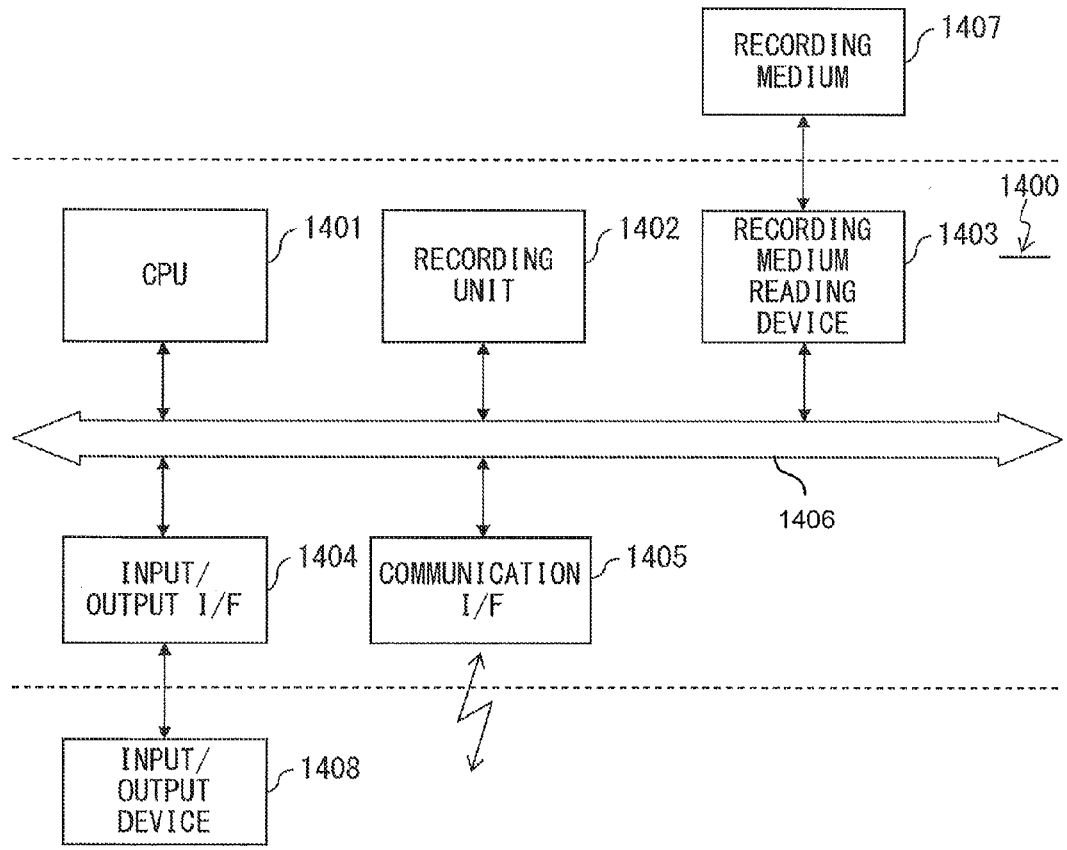
FIG. 14 illustrates one implementation example of a hardware configuration of a computer.

FIG. 14 illustrates one implementation example of a hardware configuration of a computer that can realize the apparatus described in the above first embodiment and modification example.

Hardware 1400 of the computer includes a CPU 1401, a recording unit 1402, a recording medium reading device 1403, an input/output interface 1404 (input/output I/F), a communication interface 1405 (communication I/F) and the like. These components are interconnected by a bus 1406.

The CPU 1401 executes the above described processes for managing information technology assets stored in the recording unit 1402. As a result of the execution, the CPU 1401 operates as the processing units illustrated in FIG. 2.

In the recording unit 1402, programs executed by the CPU 1401 and data are recorded. The recording unit 1402 is used also as a working area or the like. The recording unit 1402 also has the above described functions of the recording unit 24. Examples of the recording unit 1402 include a ROM, a RAM, a hard disk drive and the like.

The recording medium reading device 1403 controls a data read/write from/to a recording medium 1407 according to a control of the CPU 1401. Data written to the recording medium 1407 according to the control of the recording medium reading device 1403 is recorded, or data stored onto the recording medium 1407 is read. Moreover, examples of an attachable/detachable recording medium 1407 include a magnetic recording device, an optical disc, a magneto-optical recording medium, a semiconductor memory and the like as a non-transitory recording medium readable by a computer. Examples of the magnetic recording device include a hard disk device (HDD) and the like. Examples of the optical disc include a DVD (Digital Versatile Disc), a DVD-RAM, a CD- ROM (Compact Disc Read Only Memory), a CD-R (Recordable)/RW (ReWritable), and the like. Examples of the magneto-optical recording medium include an MO (Magneto-Optical) disk, and the like.

To the input/output interface 1404, an input/output device 1408 is connected. Information input by a user is received, and transmitted to the CPU 1401 via the bus 1406. Moreover, operation information and the like are displayed on a screen of a display according to an instruction from the CPU 1401. Examples of the input/output device 1408 include a touch panel, a keyboard, a pointing device, and the like.

The communication interface 1405 is an interface for making a LAN connection, an Internet connection or a wireless connection to another computer if necessary. Moreover, the communication interface 1405 is connected to another device, and controls a data input/output to/from an external device.

By using a computer having such a hardware configuration, the above described process functions are realized. The process functions of various types include the processes described in the embodiment and the modification example, and the processes represented by the flowcharts. In this case, a program that describes contents of the processes of the functions to be possessed by the system is provided. This program is executed by the computer, whereby the above described process functions are realized on the computer. The program that describes the process contents can be recorded onto the recording medium 1407 readable by the computer.

If the program is distributed, the recording medium 1407 such as a DVD, a CD-ROM or the like on which the program is recorded is marketed. Alternatively, the program may be stored in a storage device of a server computer, and transferred from the server computer to another computer via a network.

The computer that executes the program stores, for example, the program recorded onto the recording medium 1407 or the program transferred from the server computer in the local recording unit 1402. Then, the computer reads the program from the local recording unit 1402, and executes the processes according to the program. Alternatively, the computer can directly read the program from the recording medium 1407, and execute the processes according to the program. Still alternatively, the computer may execute a process according to a received program each time the program is transferred from the server computer.

The present invention is not limited to the above described embodiment and examples, and can be improved and modified within a scope that does not depart from the gist of the present invention. Note that the embodiment and the examples may be combined as long as they do not cause any inconsistency.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An asset managing apparatus, comprising:
a recording unit including
a first database for recording an entity identifier indicating a plurality of assets made to correspond to each of a plurality of users by relating the entity identifier to layer information used by each of the plurality of users, the layer information indicating each of a transaction layer that is a layer associated with an asset relating to a service, an application layer that is a layer associated with an asset relating to virtual software, a virtual infrastructure layer that is a layer associated with an asset relating to the virtual hardware, and a physical infrastructure layer that is a layer associated with an asset relating to real hardware and real software, and a second database for recording the entity identifier by relating the entity identifier to a linking identifier indicating a relationship among the plurality of assets;
a search extent setting unit, including a processor, configured to identify a layer made to correspond to the first asset when the first asset is related to a first user of the users is designated by referencing the first database by using the entity identifier of the first asset, to set all layers to a search extent when the identified layer is the physical infrastructure layer, and to set the layers other than the physical infrastructure layer to the search extent when the identified layer is other than the physical infrastructure layer; and
an extracting unit configured to reference to the first database and the second database by using the first asset in the search extent set by the search extent setting unit and to extract another asset related to the first asset but not related to one of the plurality of assets corresponding to one of the plurality of users other than the first user, including extracting, from among assets of the transaction layer, the application layer and the virtual infrastructure layer, all other assets directly or indirectly using an output of the first asset, all input assets that are the other assets directly or indirectly used by the first asset as an input, all the other assets that use the input asset as an input and are different from the first asset, and all the other assets directly used by the input asset present in the transaction layer, the application layer and the virtual infrastructure layer as an input from among assets of the physical infrastructure layer.

2. The asset managing apparatus according to claim 1, wherein when the search extent setting unit determines that the layer of the first asset is the physical infrastructure layer, the extracting unit extracts, from among the assets of the transaction layer, the application layer and the virtual infrastructure layer and the physical infrastructure layer, all the other assets directly or indirectly using the output of the first asset, all input assets that are the other assets directly or indirectly used by the first asset as an input, and all the other assets that use the input asset as an input and are different from the first asset.

3. An asset managing method, comprising:
recording a first database in a recoding unit an entity identifier indicating a plurality of assets made to correspond to each of a plurality of users by relating the entity identifier to layer information used by each of the plurality of users, the layer information indicating each of a transaction layer that is a layer associated with an asset relating to a service, an application layer that is a layer associated with an asset relating to virtual software, a virtual infrastructure layer that is a layer associated with an asset relating to the virtual hardware, and a physical infrastructure layer that is a layer associated with an asset relating to real hardware and real software, and recording a second database in a recoding unit the entity identifier by relating the entity identifier to a linking identifier indicating a relationship among the plurality of assets;

designating and inputting a first asset related to a first user of the users, the first asset being an asset to be examined;

identifying by using a processor a layer made to correspond to the first asset by referencing a first database by using the entity identifier of the first asset, to set all layers to a search extent when the identified layer is the physical infrastructure layer, and to set the layers other than the physical infrastructure layer to the search extent when the identifier layer is other than the physical infrastructure layer; and extracting by using the processor to reference to the first database and the second database by using the first asset in the search extent set and to extract all the other assets related to the first asset but not related to one of the plurality of assets corresponding to one of the plurality of users other than the first user, including, from among assets of the transaction layer, the application layer and the virtual layer, all the other assets directly or indirectly using an output of the first asset, and all input assets that are the other assets directly or indirectly used by the first asset as an input, and all the other assets that use the input asset as an input and are different from the first asset, and from among assets of the physical infrastructure layer, all the other assets directly used by the input asset present in the transaction layer, the application layer and the virtual as an input.

4. The asset managing method according to claim 3, wherein when the layer of the first asset is determined to be the physical infrastructure layer, all the other assets directly or indirectly using the output of the first asset, all input assets that are the other assets directly or indirectly used by the first asset as an input, and all the other assets that use the input asset as an input and are different from the first asset are extracted from among the assets of the transaction layer, the application layer and the virtual and the physical infrastructure layer.

5. A computer-readable recording medium having stored therein a program causing a computer to execute an asset managing process comprising:

recording a first database in a recoding unit an entity identifier indicating a plurality of assets made to correspond to each of a plurality of users by relating the entity identifier to layer information used by each of the plurality of users, the layer information indicating each of a transaction layer that is a layer associated with an asset relating to a service, an application layer that is a layer associated with an asset relating to virtual software, a virtual infrastructure layer that is a layer associated with an asset relating to the virtual hardware, and a physical infrastructure layer that is a layer associated with an asset relating to real hardware and real software, and recording a second database in a recoding unit the entity identifier by relating the entity identifier to a linking identifier indicating a relationship among the plurality of assets;

designating and inputting a first asset is related to a first user of the users, the first asset being an asset to be examined;

identifying a layer made to correspond to a first asset that is an asset to be examined by referencing a first database by using the entity identifier of the first asset, to set all layers to a search extent when the identified layer is the physical infrastructure layer, and to set one of the layers other than the physical infrastructure layer to the search extent when the identifier layer is other than the physical infrastructure layer;

referencing the first database and the second database by using the first asset in the search extent set and extracting another asset related to the first asset and are present in the extent but not related to one of the plurality of assets corresponding to one of the plurality of users other than the first user; and extracting, from among assets of the transaction layer, the application layer and the virtual layer, all the other assets directly or indirectly using an output of the first asset, and all input assets that are the other assets directly or indirectly used by the first asset as an input, all the other assets that use the input asset as an input and are different from the first asset, and of extracting all the other assets directly used by the input asset present in the transaction layer, the application layer and the virtual as an input from among assets of the physical infrastructure layer, when the layer of the first asset includes determined to be the transaction layer, the application layer and the virtual layer.

6. A computer-readable recording medium the having stored therein a program causing a computer to execute an asset managing process comprising:

recording a first database in a recoding unit an entity identifier indicating a plurality of assets made to correspond to each of a plurality of users by relating the entity identifier to layer information used by each of the plurality of users, the layer information indicating each of a transaction layer that is a layer associated with an asset relating to a service, an application layer that is a layer associated with an asset relating to virtual software, a virtual infrastructure layer that is a layer associated with an asset relating to the virtual hardware, and a physical infrastructure layer that is a layer associated with an asset relating to real hardware and real software, and recording a second database in a recoding unit the entity identifier by relating the entity identifier to a linking identifier indicating a relationship among the plurality of assets;

designating and inputting a first asset is related to a first user of the users, the first asset being an asset to be examined;

identifying a layer made to correspond to a first asset that is an asset to be examined by referencing a first database by using the entity identifier of the first asset, to set all layers to a search extent when the identified layer is the physical infrastructure layer, and to set one of the layers other than the physical infrastructure layer to the search extent when the identifier layer is other than the physical infrastructure layer;

referencing the first database and the second database by using the first asset in the search extent set and extracting another asset related to the first asset and are present in the extent but not related to one of the plurality of assets corresponding to one of the plurality of users other than the first user; and extracting, from among the assets of the transaction layer, the application layer and the virtual and the physical infrastructure layer, all the other assets directly or indirectly using the output of the first asset, all input assets that are the other assets directly or indirectly used by the first asset as an input, and all the other assets that use the input asset as an input and are different from the first asset, when the layer of the first asset is determined to be the physical infrastructure layer.

* * * * *

UNITED STATES PATENT AND TRADEMARK OFFICE
CERTIFICATE OF CORRECTION

PATENT NO. : 8,856,174 B2  
APPLICATION NO. : 13/606811  
DATED : October 7, 2014  
INVENTOR(S) : Shigeki Fueta et al.

Page 1 of 1

It is certified that error appears in the above-identified patent and that said Letters Patent is hereby corrected as shown below:

On the Title Page

First Page, Column 2, Item [57] (Abstract), Line 1, Delete "extend" and insert -- extent --, therefor.

In the Claims

Column 24, Line 28, In Claim 6, after "medium" delete "the".

Signed and Sealed this
Twenty-fourth Day of February, 2015

Michelle K. Lee
*Deputy Director of the United States Patent and Trademark Office*